United States Patent
Mochizuki

(10) Patent No.: US 8,394,184 B2
(45) Date of Patent: Mar. 12, 2013

(54) ABSORBENT MATERIAL FOR LOW-MOLECULAR-WEIGHT ORGANIC GAS AND FUEL VAPOR TREATMENT APPARATUS USING SAME

(75) Inventor: Yuji Mochizuki, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 412 days.

(21) Appl. No.: 12/087,310

(22) PCT Filed: Jan. 4, 2007

(86) PCT No.: PCT/JP2007/050002
§ 371 (c)(1),
(2), (4) Date: Jul. 1, 2008

(87) PCT Pub. No.: WO2007/077986
PCT Pub. Date: Jul. 12, 2007

(65) Prior Publication Data
US 2009/0007790 A1    Jan. 8, 2009

(30) Foreign Application Priority Data
Jan. 6, 2006  (JP) .................................. 2006-001676

(51) Int. Cl.
*B01D 53/02* (2006.01)
(52) U.S. Cl. ............... 96/153; 96/108; 95/146; 502/417
(58) Field of Classification Search .................... 96/108, 96/153; 95/146; 123/518, 519, 520
See application file for complete search history.

(56) References Cited

U.S. PATENT DOCUMENTS

| | | | | |
|---|---|---|---|---|
| 3,005,035 A | * | 10/1961 | Kimberlin, Jr. et al. | 585/736 |
| 3,763,255 A | * | 10/1973 | Hayes | 585/434 |
| 5,159,885 A | * | 11/1992 | Hasebe et al. | 110/346 |
| 5,421,860 A | * | 6/1995 | Bretz et al. | 95/115 |
| 6,352,578 B1 | * | 3/2002 | Sakata et al. | 96/134 |
| 6,706,092 B2 | * | 3/2004 | Rohrbach et al. | 95/90 |
| 2003/0226443 A1 | | 12/2003 | Rajagopalan et al. | |
| 2005/0014642 A1 | | 1/2005 | Oi et al. | |
| 2005/0268633 A1 | * | 12/2005 | Smith et al. | 62/238.3 |
| 2006/0180024 A1 | * | 8/2006 | Nishida et al. | 95/141 |

FOREIGN PATENT DOCUMENTS

| | | |
|---|---|---|
| JP | 59-151882 A | 8/1984 |
| JP | 60-114339 A | 6/1985 |
| JP | 60-100559 U | 7/1985 |
| JP | 3-130570 A | 6/1991 |

(Continued)

OTHER PUBLICATIONS

Office Action for corresponding Japanese Application No. 2006-001676 dated Oct. 18, 2011.

*Primary Examiner* — Duane Smith
*Assistant Examiner* — Christopher P Jones
(74) *Attorney, Agent, or Firm* — Birch, Stewart, Kolasch & Birch, LLP

(57) ABSTRACT

Provided are a low-molecular-weight organic gas absorbent material including a porous material having an average pore size of 10 to 200 nm impregnated with one or more organic compounds having 10 or more carbon atoms in a proportion of 10 wt % or more based on the porous material, and a fuel vapor treatment apparatus for an internal combustion engine using this low-molecular-weight organic gas absorbent material. This low-molecular-weight organic gas absorbent material sufficiently absorbs and removes low-molecular-weight organic gases even for a porous material having large pores which cannot adsorb low-molecular-weight organic gases such as butane and the like.

11 Claims, 2 Drawing Sheets

FOREIGN PATENT DOCUMENTS

| | | |
|---|---|---|
| JP | 4-114736 A | 4/1992 |
| JP | 10-151343 A | 6/1998 |
| JP | 11-76812 A | 3/1999 |
| JP | 11-99331 A | 4/1999 |
| JP | 2004-148280 A | 5/2004 |
| JP | 2005-35812 A | 2/2005 |
| JP | 2005-533633 A | 11/2005 |
| WO | WO01/78644 A1 * | 10/2001 |
| WO | WO 03082927 A1 * | 10/2003 |

* cited by examiner

ABSORBENT MATERIAL FOR LOW-MOLECULAR-WEIGHT ORGANIC GAS AND FUEL VAPOR TREATMENT APPARATUS USING SAME

TECHNICAL FIELD

The present invention relates to a low-molecular-weight organic gas absorbent material having excellent absorbency of various low-molecular-weight organic gases. The present invention also relates to a fuel vapor treatment apparatus equipped with this low-molecular-weight organic gas absorbent material as an absorbent material.

BACKGROUND ART

Automobile exhaust gas and industrial exhaust gases produced by the evaporation of organic solvents during the drying process in the paint industry, for example, have become an environmental problem. There is thus a need for efficient recovery of such organic gases.

Gasoline, which is the fuel used in automobiles, is highly volatile. Therefore, when the automobile is moving or is parked under the scorching sun, gasoline vaporizes in the fuel tank, and the gasoline vapor is discharged into the atmosphere. Gasoline vapor is also produced during refueling.

Accordingly, to prevent gasoline vapor from being discharged from the automobile, a canister is provided in the automobile and active carbon or the like contained in the canister is used as an absorbent material. For example, JP Patent Publication (Kokai) No. 2005-35812 A describes that by allowing an organic substance to be adsorbed on starting active carbon having a wide range of pore sizes so that the smaller-sized pores are selectively blocked, the resulting active carbon has excellent adsorption/desorption properties. Patent Document 1 also describes that a canister using such active carbon suppresses the adsorbed component from leaking.

However, porous materials having pores such as active carbon for the adsorption and removal of organic gases have been developed and are in use. The adsorption mechanism of such organic gases is reported to be that the organic gas is liquefied under high pressure inside micropores of the porous material and is retained by adsorption inside the micropores.

Accordingly, the pore size of the adsorbent material is optimized according to the molecular weight, concentration and the like of the organic gas to be adsorbed. For adsorption of comparatively low-molecular-weight organic gases, such as butane, a porous material having a large number of micropores with a diameter of 5 nm or less is optimal. In contrast, for a porous material having large pores of a diameter of 10 nm or more, it is difficult for the organic gas to be liquefied under high pressure inside the pores, so that the low-molecular-weight gas is not retained by adsorption.

DISCLOSURE OF THE INVENTION

The adsorbent material described in JP Patent Publication (Kokai) No. 2005-35812 A uses active carbon which appears to have an average pore size close to 2 to 5 nm. However, there are no examples using a porous material having large pores with an average pore size of about 10 to 200 nm for the adsorption or absorption of a low-molecular-weight organic gas.

Accordingly, it is an object of the present invention to provide a low-molecular-weight organic gas absorbent material which sufficiently absorbs and removes low-molecular-weight organic gases even for a porous material having large pores which usually cannot adsorb low-molecular-weight organic gases such as butane and the like.

Utilizing the dissolving action of a low-molecular-weight organic gas dissolving in an organic solvent, the present inventor discovered that by impregnating an organic substance having a relatively high molecular weight, a low-molecular-weight organic gas dissolves even in a porous material having large pores which usually cannot adsorb low-molecular-weight organic gases such as butane and the like. As a result, the low-molecular-weight organic gas is removed by adsorption. Such a material can thus serve as a sufficient low-molecular-weight organic gas absorbent material. Based on this discovery, the inventor arrived at the present invention.

Specifically, first, the present invention is an invention of a low-molecular-weight organic gas absorbent material, characterized by comprising a porous material having an average pore size of 10 to 200 nm impregnated with one or more organic compounds having 10 or more carbon atoms (preferably 10 to 100) in a proportion of 10 wt % or more based on the porous material. As a result, the low-molecular-weight organic gas absorbent material according to the present invention exhibits excellent low-molecular-weight organic gas absorbance having, for example, an n-butane saturated adsorption amount at 25° C. of 20 g/L or more, and even 40 g/L or more is possible. A saturated adsorption amount of 20 g/L or more is exhibited not only for butane, but also for other low-molecular-weight organics such as benzene, toluene and the like.

Perceiving the low-molecular-weight organic gas absorbent material according to the present invention from a different perspective, the volatile content of the absorbent material at 200° C. under a nitrogen atmosphere is preferably not more than 3 wt %. Further, the volatile content of the absorbent material at 900° C. is preferably not more than 8 wt %.

In the present invention, preferred examples of the organic compound impregnated in the porous material include: (1) organics having a boiling point of 200° C. or more; (2) organics having a molecular weight of 200 or more; and (3) organics which are liquid or semi-solid at ordinary temperatures. More specifically, preferred organic compounds include one or more selected from aliphatic hydrocarbons, alcohols, carboxylic acids, ketones, ethers, esters and aromatic hydrocarbons, all having 10 or more carbon atoms.

In the present invention, various inorganic materials and/or organic materials may be used as the porous material which serves as the main material of the low-molecular-weight organic gas absorbent material. Silica gel or various high-molecular-weight porous materials can be used. The shape of the material is not limited. Preferred examples include shapes which can be packed in a canister and the like, such as a cylindrical pellet shape having a diameter of 0.5 to 4.0 mm and a honeycomb shape having a void ratio of 30% or more.

Second, the present invention is a fuel vapor treatment apparatus for an internal combustion engine using the above-described low-molecular-weight organic gas absorbent material. Although the fuel vapor treatment apparatus configuration is not especially limited, preferably the absorbent material, which is an adsorbent material, is used at least in a section close to the air port. Further, cases where the fuel vapor treatment apparatus is a multilayered structure are also preferably included in the scope of the present invention.

The fuel vapor treatment apparatus is not especially limited so long as it treats low-molecular-weight organic gases and the like produced by an internal combustion engine. Specific examples may include an automobile canister and the like.

Even though the low-molecular-weight organic gas absorbent material according to the present invention has a porous material with an average pore size of 10 to 200 nm as a main material, it still exhibits excellent low-molecular-weight organic gas absorption performance as compared with a conventional absorbent material such as silica gel having pores in the order of nanometers. This enables the absorption and removal of low-molecular-weight organic gases which cannot be removed with a conventional gas absorbent material, by utilizing the dissolving action into the impregnated organic compound. Specifically, a target adsorption gas can be taken in even into the relatively large pores which were not used for a non-treated absorbent material, whereby the absorption/removal performance of the whole absorbent material dramatically improves.

BEST MODE FOR CARRYING OUT THE INVENTION

Figure 1:
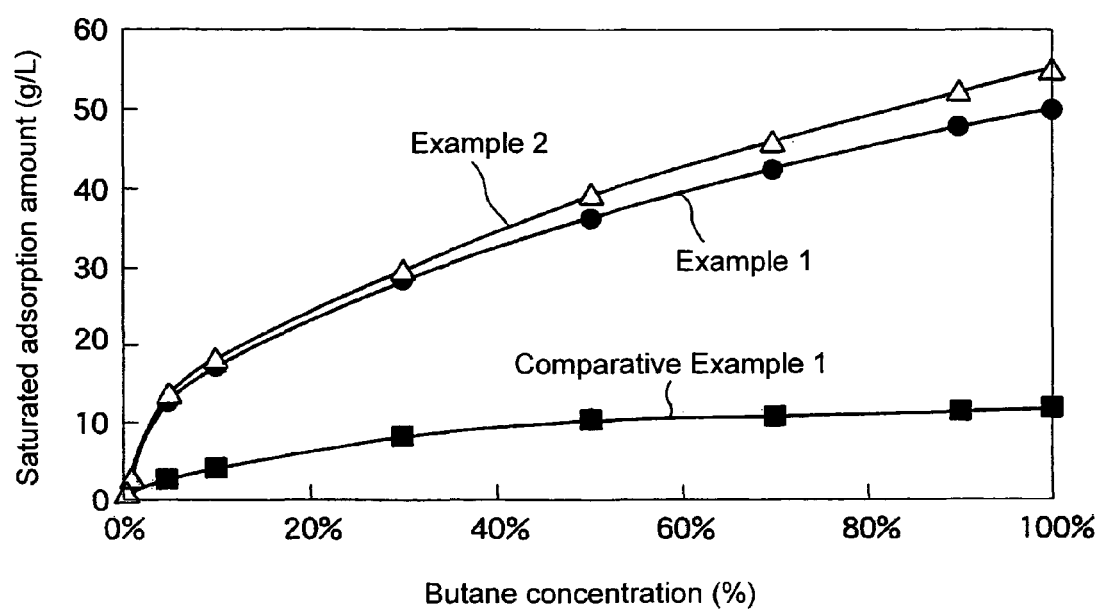
FIG. 1 shows butane adsorption isotherms determined from the relationship between butane concentration and equilibrium adsorption amount.

In the present invention, as described above, preferred examples of the organic compound impregnated in the porous material include: (1) organics having a boiling point of 200° C. or more; (2) organics having a molecular weight of 200 or more; and (3) organics which are liquid or semi-solid at ordinary temperatures. More specifically, as described above, preferred organic compounds include one or more selected from aliphatic hydrocarbons, alcohols, carboxylic acids, ketones, ethers, esters and aromatic hydrocarbons, all having 10 or more carbon atoms. In the present invention, organic compounds applicable to these examples may be broadly used. Specific examples of these organic compounds will now be described below.

Examples of the organic compound include aliphatic hydrocarbon compounds and carbocyclic hydrocarbon compounds. More specifically, examples include paraffinic liquids, highly-soluble petroleum naphtha, kerosene, terpenes, pine oil and the like, all having 10 or more carbon atoms.

Examples of higher alcohols include aliphatic alcohols which are liquid at ordinary temperatures, having a branched and/or unsaturated carbon chain containing 10 to 26 carbon atoms, such as octyldodecanol, isostearyl alcohol, oleyl alcohol, 2-hexyldecanol, 2-butyloctanol and 2-undecylpentadecanol.

The fatty acid may have a chain length varying between 10 and 24 carbon atoms. These chains may be linear or branched, and may be saturated or unsaturated. Examples of these higher fatty acids include oleic acid, linoleic acid, linolenic acid and the like.

A higher ether having 10 to 40 carbon atoms may also be used.

Further examples include linear or branched hydrocarbons of mineral or synthetic origin, such as petroleum jelly, polydecenes, and hydrogenated polyisobutenes such as PARLEAM, squalane, and mixtures thereof.

The higher ester is, for example, an oil of formula $R_1COOR_2$, in which $R_1$ represents a linear or branched fatty acid residue containing from 1 to 40 carbon atoms and $R_2$ represents a hydrocarbon-based chain, which is in particular branched, containing from 1 to 40 carbon atoms, on condition that $R_1+R_2 \geq 10$. Specifically, such examples include purcellin oil (cetearyl octanoate), isopropyl myristate, isopropyl palmitate, alkyl benzoates having 12 to 15 carbon atoms, hexyl laurate, diisopropyl adipate, isononyl isononanoate, 2-ethylhexyl palmitate, isostearyl isostearate, alcohol or polyalcohol heptanoates, octanoates, decanoates or ricinoleates, for instance propylene glycol dioctanoate; hydroxylated esters, for instance isostearyl lactate or diisostearyl malate; polyol esters and pentaerythritol esters.

In addition, examples of various organic solvents include aromatic solvents having 10 to 100 carbon atoms, and liquids which preferably are liquid at ordinary temperatures, for instance: oils and fats such as soybean oil, canola oil, corn oil, safflower oil, sunflower oil, cotton seed oil, olive oil, palm oil, linseed oil, castor oil, fish oil, lard and beef tallow, as well as mixtures and fractions thereof, or transesterified processed oils and fats. Further examples include glycerides (these may include diglycerides and monoglycerides) having 10 or more carbon atoms per unit molecule which have as a constituent fatty acid a single or mixed fatty acid having 2 to 10 carbons atoms. Still further examples include oleic acid, linoleic acid and oleyl alcohols, which are derivatives thereof, obtainable from natural oils and fats.

From the perspective of using the low-molecular-weight organic gas absorbent material according to the present invention by packing into an automobile canister, the average particle size after shaping is preferably 0.5 to 40 mm, and more preferably 2 to 3 mm. Further, the length of the shaped active carbon is about 0.5 to 10 mm, and preferably about 3 to 5 mm. If the average particle size is too small, airflow resistance increases, while if the average particle size is too large, the packing density decreases, whereby performance deteriorates.

EXAMPLES

The present invention will now be described with reference to the following examples and comparative examples.

Example 1

Thirty parts by weight of n-dodecane as the organic compound was dipped and impregnated into 100 parts of hydrophobic silica gel with an average pore size of 30 nm. The gel was then dried for 1 hour at 200° C. using a drier to obtain the desired absorbent material 1. The volatile content of this absorbent material 1 at 200° C. was 2.2%, and at 900° C. the volatile content was 19.6%. The 100% butane saturated adsorption amount at 25° C. of this absorbent material 1 was 50.5 g/mL. The results of an n-butane adsorption isotherm at 25° C. of this absorbent material 1 are shown in FIG. 1.

Example 2

Thirty parts by weight of linoleic acid as the organic compound was dipped and impregnated into 100 parts of hydrophobic silica gel with an average pore size of 30 nm. The gel was then dried for 1 hour at 200° C. using a drier to obtain the desired absorbent material 2. The volatile content of this absorbent material 2 at 200° C. was 0.6%, and at 900° C. the volatile content was 15.3%. The 100% butane saturated adsorption amount at 25° C. of this absorbent material 2 was 50.6 g/mL. The results of an n-butane adsorption isotherm at 25° C. of this absorbent material 2 are shown in FIG. 1.

Comparative Example 1

The 100% butane saturated adsorption amount at 25° C. of the simple silica gel used in Examples 1 and 2 was 1.3 g/mL.

Figure 2:
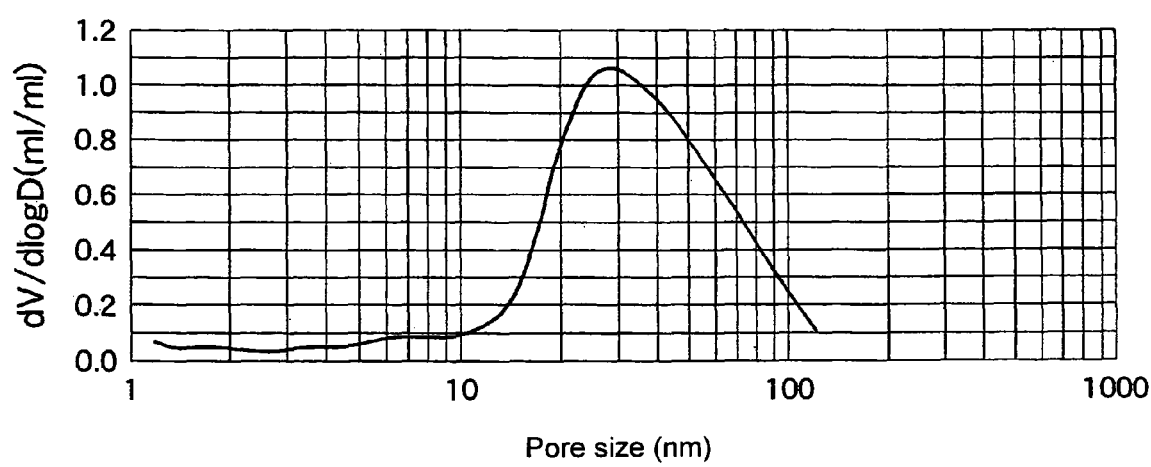
FIG. 2 shows the $N_2$ pore distribution of simple silica gel.

The volatile content of this simple silica gel at 200° C. was 0.3%, and at 900° C. the volatile content was 0.8%. The results of an adsorption isotherm at 25° C. of this simple silica gel are shown in FIG. 1. Further, the $N_2$ pore distribution of this simple silica gel is shown in FIG. 2.

FIG. 1 shows the results of 100% butane saturated adsorption amount at 25° C.

TABLE 1

|  | Impregnated matter | Butane saturated adsorption amount (g/L) |
|---|---|---|
| Example 1 | n-Dodecane | 50.5 |
| Example 2 | Linoleic acid | 55.6 |
| Comparative Example 1 | No impregnation | 11.3 |

From the results of FIG. 1 and Table 1, it can be seen that Examples 1 and 2 of the present invention had dramatically better butane absorbance than Comparative Example 1.

From the results of FIG. 2, it can be seen that the simple silica gel had an average pore size of 10 to 100 nm. Compared with the average pore size of typical active carbon of a few nm, it can be seen that this simple silica gel has very large pores.

[Evaluation Methods]

The evaluation methods of the n-butane adsorption isotherm at 25° C. and the 100% butane saturated adsorption amount are as follows.

1. A column having an inner diameter of 14.6 mm is packed with 10 mL of an absorbent material, and then dipped in a 25° C. water bath.

2. While adjusting the balance between butane and $N_2$ to give an arbitrary concentration, this mixture is flowed through the column at an overall flow rate of 480 mL/min to allow the mixture to adhere.

3. The column is removed at an arbitrary time, the increased amount is measured, and then the mixture is adhered until it is a constant mass.

4. The operations of 2 and 3 are repeated at each butane concentration to determine the saturated adsorption amount for each butane concentration.

The term "100% butane saturated adsorption amount" is the adsorption amount at a 100% butane concentration in the above tests.

It is noted that the above results were described for when butane was used as the low-molecular-weight organic gas. However, similar results could also be obtained for gases consisting of other low-molecular-weight organic compounds, such as benzene, toluene and the like.

INDUSTRIAL APPLICABILITY

According to the present invention, a low-molecular-weight organic gas absorbent material can be provided which sufficiently absorbs and removes low-molecular-weight organic gases even for a porous material having large pores which usually cannot adsorb low-molecular-weight organic gases such as butane and the like. A canister using such low-molecular-weight organic gas absorbent material has a large adsorption amount of hydrocarbons (HC), and thus contributes in suppressing the volatilization of hydrocarbon gases, such as gasoline, into the air.

The invention claimed is:

1. A low-molecular-weight organic gas absorbent material comprising a porous material having an average pore size of 10 to 100 nm impregnated with one or more organic compounds having a boiling point of 200° C. or more, and selected from saturated aliphatic hydrocarbons, said organic compounds all having 10 to 100 carbon atoms, in a proportion of 10 wt % or more based on the porous material, wherein the organic compounds are in the form of liquid or semi-solid at an ordinary temperature.

2. The low-molecular-weight organic gas absorbent material according to claim 1, wherein said adsorbent material has a volatile content of the absorbent material at 200° C. under a nitrogen atmosphere of not more than 3 wt %.

3. A fuel vapor treatment apparatus for an internal combustion engine comprising the low-molecular-weight organic gas absorbent material according to claim 1.

4. A fuel vapor treatment apparatus for an internal combustion engine comprising the low-molecular-weight organic gas absorbent material according to claim 2.

5. The low-molecular-weight organic gas absorbent material according to claim 1, wherein the porous material is a silica gel.

6. The low-molecular-weight organic gas absorbent material according to claim 1, wherein the porous material is activated carbon.

7. The low-molecular-weight organic gas absorbent material according to claim 1, wherein said one or more aliphatic hydrocarbons are selected from the group consisting of linear or branched hydrocarbons of mineral or synthetic origin.

8. The low-molecular-weight organic gas absorbent material according to claim 7, wherein said one or more aliphatic hydrocarbons are selected from the group consisting of hydrogenated polyisobutenes and squalane.

9. A shaped active carbon having an average particle size of 0.5 to 40 micrometers, which is obtained by shaping the low-molecular-weight organic gas absorbent material of claim 1.

10. The low-molecular-weight organic gas absorbent material according to claim 1, wherein said organic compound is n-dodecane.

11. A low-molecular-weight organic gas absorbent material according to claim 10, which is obtained by dipping n-dodecane into the porous material in a proportion of 10 weight-% or more based on the porous material, followed by drying at 200° C.

* * * * *